United States Patent
Nomura et al.

(10) Patent No.: US 9,509,245 B2
(45) Date of Patent: Nov. 29, 2016

(54) CONTROL DEVICE AND CONTROL METHOD FOR LINEAR MOTOR

(71) Applicant: THK CO., LTD., Tokyo (JP)

(72) Inventors: Yuki Nomura, Tokyo (JP); Takashi Natori, Tokyo (JP); Hideya Nakayama, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/021,389

(22) PCT Filed: Aug. 25, 2014

(86) PCT No.: PCT/JP2014/072152
§ 371 (c)(1),
(2) Date: Mar. 11, 2016

(87) PCT Pub. No.: WO2015/037423
PCT Pub. Date: Mar. 19, 2015

(65) Prior Publication Data
US 2016/0226417 A1    Aug. 4, 2016

(30) Foreign Application Priority Data

Sep. 13, 2013  (JP) ................................. 2013-190961

(51) Int. Cl.
*H02P 6/00*  (2016.01)
*H02P 21/06* (2016.01)

(52) U.S. Cl.
CPC ............. *H02P 25/064* (2016.02); *H02P 21/06* (2013.01)

(58) Field of Classification Search
CPC ...... H02P 25/021; H02P 25/023; H02P 6/18; H02P 6/14; H02P 6/08; H02P 27/04
USPC ........ 318/38, 400.01, 400.02, 114, 119, 126, 318/135, 700, 701, 721, 727, 778, 779, 799, 318/801, 400.14, 400.15, 400.32, 400.4, 318/430, 432, 437, 687, 689; 363/40, 44, 363/95, 175
See application file for complete search history.

(56) References Cited

U.S. PATENT DOCUMENTS

| | | | |
|---|---|---|---|
| 6,445,154 B1 * | 9/2002 | Toyozawa | H02P 6/18 318/700 |
| 7,170,283 B2 * | 1/2007 | Toyozawa | H02P 1/46 318/700 |
| 2005/0104582 A1 | 5/2005 | Toyozawa et al. | |

FOREIGN PATENT DOCUMENTS

| | | |
|---|---|---|
| CN | 101635499 A | 1/2010 |
| JP | 5-15179 A | 1/1993 |

(Continued)

OTHER PUBLICATIONS

International Search Report dated Nov. 11, 2014, issued in counterpart Application No. PCT/JP2014/072152 (2 pages).

(Continued)

*Primary Examiner* — Antony M Paul
(74) *Attorney, Agent, or Firm* — Westerman, Hattori, Daniels & Adrian, LLP

(57) ABSTRACT

A control device for linear motor where a range in which the current magnetic pole position of the linear motor exists is refined using the pulse energization with a suppressed amount of movement of the mover, direct current excitation is performed while changing the refined estimated magnetic pole position by a second amount of change smaller than a first amount of change used for refinement of the estimated magnetic pole position during pulse energization, and it is determined that the estimated magnetic pole position matches the current magnetic pole position of the linear motor when the amount of movement of the mover acquired each time the estimated magnetic pole position is changed matches the amount of movement of the second amount of change.

4 Claims, 8 Drawing Sheets

(56) References Cited

FOREIGN PATENT DOCUMENTS

| | | |
|---|---|---|
| JP | 2001-78487 A | 3/2001 |
| JP | 2005-151752 A | 6/2005 |
| JP | 2013-115878 A | 6/2013 |
| WO | 2007/114058 A1 | 10/2007 |

OTHER PUBLICATIONS

Office Action dated Sep. 13, 2016, issued in counterpart Chinese Patent Application No. 201480049919.8, with Partial English translation of the Search Report. (9 pages).

* cited by examiner (INSTALLED VERTICALLY)

(INSTALLED IN REVERSE AND VERTICALLY)

(INSTALLED VERTICALLY)

(INSTALLED IN REVERSE AND VERTICALLY)

CONTROL DEVICE AND CONTROL METHOD FOR LINEAR MOTOR

TECHNICAL FIELD

The present invention relates to a control device and a control method for a linear motor.

Priority is claimed on Japanese Patent Application No. 2013-190961, filed Sep. 13, 2013, the content of which is incorporated herein by reference.

BACKGROUND ART

When a linear motor is not energized according to a relative positional relationship (magnetic pole position) between a plurality of coils provided in any one of a mover and a stator and a driving magnet provided in the other of the mover and the stator, a thrust according to a thrust constant of the linear motor cannot be generated.

Therefore, when the linear motor starts up, it is necessary to recognize a position of the mover relative to the stator. For example, when the linear motor starts up, a current corresponding to a predetermined magnetic pole position is applied to the linear motor for a certain time and the mover is pulled to the magnetic pole position (direct current excitation) (Patent Literature 1).

PRIOR ART

Patent Literature

[Patent Literature 1] Japanese Unexamined Patent Application, First Publication No. H05-015179

SUMMARY OF INVENTION

Technical Problem

When a mover is located in a magnetic pole position shifted by 180° with respect to a predetermined electrical angle, a thrust force for pulling the mover cannot be generated even when a current corresponding to the magnetic pole position is applied to a linear motor, and the mover is unlikely to be pulled to the magnetic pole position. Further, when there is an external force acting on the mover, the mover is unlikely to be pulled to the magnetic pole position even when the current corresponding to the magnetic pole position is applied to the linear motor. In such a case, the magnetic pole position is unlikely to be recognized, and control of generating a predetermined thrust or moving the mover to a predetermined position is unlikely to be accurately performed.

The present invention has been made to solve the above problems, and an object of the present invention is to provide a control device and a control method for a linear motor which are capable of improving accuracy of detection of a magnetic pole position.

Solution to Problem

According to a first aspect of the present invention, a control device that controls a linear motor includes a section estimation unit that estimates which of a plurality of sections obtained by dividing magnetic pole positions from 0° to 360° includes a current magnetic pole position of the linear motor based on a movement direction of a mover by a plurality of pulse energizations; a magnetic pole position refinement unit that performs pulse energization while changing the estimated magnetic pole position by a first predetermined amount of change from any one of a minimum value and a maximum value of the section estimated by the section estimation unit to the other, and approximates the estimated magnetic pole position to the current magnetic pole position based on the movement of the mover when the pulse energization is performed; and a magnetic pole position detection unit that performs direct current excitation while changing the estimated magnetic pole position approximated by the magnetic pole position refinement unit by a second amount of change smaller than the first amount of change, acquires an amount of movement of the mover each time the estimated magnetic pole position is changed, and determines that the estimated magnetic pole position matches the current magnetic pole position when the acquired amount of movement matches an amount of movement corresponding to the second amount of change.

According to a second aspect of the present invention, in a control device for a linear motor according to the first aspect, the magnetic pole position refinement unit determines that the refinement for approximating the estimated magnetic pole position to the current magnetic pole position is complete when a direction of movement of the mover is different between two consecutive pulse energizations or when the mover is moved in one of the pulse energizations and is not moved in the other pulse energization.

According to a third aspect of the present invention, in the control device for a linear motor according to the second aspect, when the direction of movement of the mover is different between the two consecutive pulse energizations and when the mover is not moved in a current pulse energization between the two consecutive pulse energizations, the mover is moved in a previous pulse energization, and the mover is moved in reverse after the previous pulse energization, and when the mover is moved in the current pulse energization between the two consecutive pulse energizations and the mover is not moved in the previous pulse energization and when the mover is not moved in the current pulse energization between the two consecutive pulse energizations, the mover is moved in the previous pulse energization, and the mover is not moved in reverse after the previous pulse energization, the magnetic pole position detection unit switches between performing the direct current excitation while increasing the estimated magnetic pole position by the second amount of change and performing direct current excitation while decreasing the estimated magnetic pole position by the second amount of change.

According to a fourth aspect of the present invention, a control method performed by a control device that controls a linear motor includes a section estimation step of estimating which of a plurality of sections obtained by dividing magnetic pole positions from 0° to 360° includes a current magnetic pole position of the linear motor based on a movement direction of a mover by a plurality of pulse energizations; a magnetic pole position refinement step of performing pulse energization while changing the estimated magnetic pole position by a first predetermined amount of change from any one of a minimum value and a maximum value of the section estimated in the section estimation step to the other, and approximating the estimated magnetic pole position to the current magnetic pole position based on the movement of the mover when the pulse energization is performed; and a magnetic pole position detection step of performing direct current excitation while changing the estimated magnetic pole position approximated in the magnetic pole position refinement step by a second amount of change smaller than the first amount of change, acquiring an amount of movement of the mover each time the estimated magnetic pole position is changed, and determining that the estimated magnetic pole position matches the current magnetic pole position when the acquired amount of movement matches an amount of movement corresponding to the second amount of change.

Advantageous Effects of Invention

According to the control device and the control method for a linear motor described above, since a range in which the current magnetic pole position of the linear motor exists is refined using the pulse energization with a suppressed amount of movement of the mover, direct current excitation is performed while changing the refined estimated magnetic pole position by the second amount of change, and it is determined that the estimated magnetic pole position matches the current magnetic pole position of the linear motor when the amount of movement of the mover acquired each time the estimated magnetic pole position is changed matches the amount of movement of the second amount of change, it is possible to improve accuracy of detection of the magnetic pole position.

DESCRIPTION OF EMBODIMENTS

Figure 1:
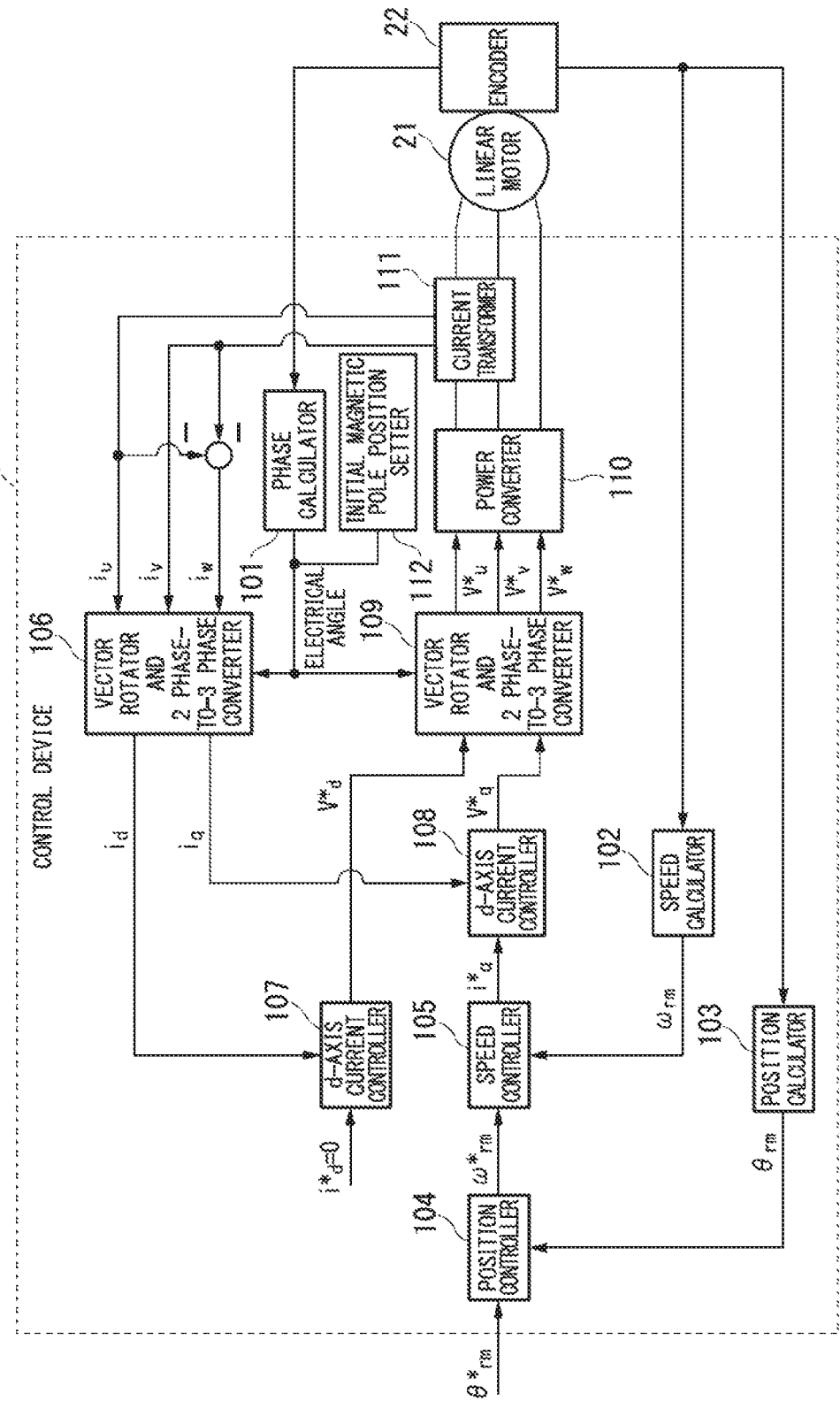
FIG. 1 is a schematic block diagram illustrating a control device 10 for a linear motor 21 according to the present embodiment.

Hereinafter, a control device and a control method for a linear motor in embodiments of the present invention will be described with reference to the drawings. FIG. 1 is a schematic block diagram illustrating a control device 10 for a linear motor 21 according to an embodiment. The control device 10 flows a 3-phase armature current to coils of U, V and W phases included in the linear motor 21 to generate a moving field which linearly moves, and move a mover of the linear motor 21 relative to a stator.

In a movable coil type permanent magnet synchronous linear motor in which a field linearly moves, an armature current of a d-axis and a q-axis is controlled using a d-q coordinate system of rotating coordinates, similar to a rotation field type synchronous motor in which a field rotates. A conversion into a Cartesian coordinate system in which a fixed portion (a stator) and a rotating portion (a mover) of a motor rotate together is a d-q conversion, and a coordinate system thereof is a d-q coordinate system. The q-axis is a phase shift which is advanced by $\pi/2$ relative to the d-axis. In a permanent magnet synchronous motor, the d-axis is generally taken in a direction of a magnetic flux produced by a magnetic field, and in a rotating field type permanent magnet synchronous motor, the d-q coordinates are rotating coordinates.

Figure 2:
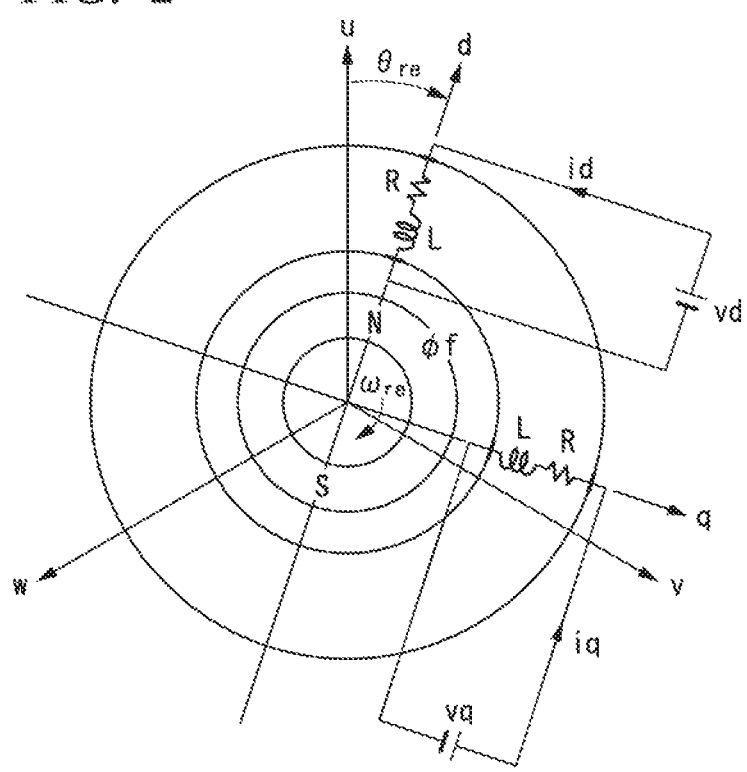
FIG. 2 is a diagram illustrating an equivalent circuit of a permanent magnet synchronous motor in a d-q coordinate system.

FIG. 2 is a diagram illustrating an equivalent circuit of the permanent magnet synchronous motor in a d-q coordinate system. In FIG. 2, $v_d$ is a d-axis armature voltage, and $v_q$ is a q-axis armature voltage. $i_d$ is a d-axis armature current, and $i_q$ is a q-axis armature current. $\phi_f$ is an armature winding flux linkage number, R is an armature winding resistance, and L is a self-inductance of the armature winding. When the q-axis armature current is used, a thrust T of the permanent magnet synchronous motor is expressed using the following equation.

$$T = p \phi_f i_q$$

In the case of the permanent magnet synchronous motor, since the armature winding flux linkage number $\phi_f$ is not changed, the thrust can be controlled by controlling the q-axis armature current $i_q$. Here, the d-axis armature current $i_d$ is generally controlled to be 0 in terms of motor efficiency. In order to control the currents $i_d$ and $i_q$ in this way, it is necessary to control the d-axis armature voltage $v_d$ and the q-axis armature voltage $v_q$. Further, it is necessary to recognize positions of the d-axis and the q-axis. In this case, if there is a difference between actual d-q coordinates in the linear motor 21 and $\hat{d}$-$\hat{q}$ coordinates (a true value) recognized in the control device 10, an error occurs in control of the linear motor 21, and accordingly, it is necessary to accurately acquire the $\hat{d}$-$\hat{q}$ coordinates.

Referring back to FIG. 1, a configuration of the control device 10 will be described. The control device 10 includes a phase calculator 101, a speed calculator 102, a position calculator 103, a position controller 104, a speed controller 105, a vector rotator and 3 phase-to-2 phase converter 106, a d-axis current controller 107, a q-axis current controller 108, a vector rotator and 2 phase-to-3 phase converter 109, a power converter 110, a current transformer 111, and an initial magnetic pole position setter 112.

An amount of movement of the mover of the linear motor 21 is input from an encoder 22 attached to the linear motor 21 to the phase calculator 101. If setting of the initial magnetic pole position is performed, the phase calculator 101 calculates a magnetic pole position $\theta_{re}$ (a position of the d-axis and an electric angle) of the linear motor 21 based on the initial magnetic pole position and the amount of movement input from the encoder 22. The phase calculator 101 inputs the calculated magnetic pole position to the vector rotator and 3 phase-to-2 phase converter 106 and the vector rotator and 2 phase-to-3 phase converter 109.

The amount of movement of the mover of the linear motor 21 is input from the encoder 22 to the speed calculator 102. The speed calculator 102 calculates a movement speed of the mover based on the amount of movement of the mover input after the setting of the initial magnetic pole position is performed. The speed calculator 102 inputs a calculated movement speed $\omega_{rm}$ to the speed controller 105.

The amount of movement of the mover of the linear motor 21 is input from the encoder 22 to the position calculator 103. The position calculator 103 calculates a position of the mover based on the amount of movement of the mover input after the setting of the initial magnetic pole position is performed. The position calculator 103 inputs a calculated position $\theta_{rm}$ of the mover to the position controller 104.

A position command value $\theta^*_{rm}$ from an upper level control device (not illustrated) and the position $\theta_{rm}$ of the mover from the position calculator 103 are input to the position controller 104. The position controller 104 calculates a speed command value $\omega^*_{rm}$ based on a deviation between the input position command value $\theta_{rm}$ and the input position $\theta_{rm}$. The position controller 104 inputs the calculated speed command value $\omega^*_{rm}$ to the speed controller 105.

The speed command value $\omega^*_{rm}$ from the position controller 104 and the movement speed $\omega_{rm}$ from the speed calculator 102 are input to the speed controller 105. The speed controller 105 calculates a q-axis current command value $i^*_q$ based on a deviation between the input speed command value $\omega^*_{rm}$ and the input movement speed $\omega_{rm}$. The speed controller 105 inputs the calculated q-axis current command value $i^*_q$ to the q-axis current controller 108.

3-phase feedback current values $i_u$ and $i_v$ input from the current transformer 111 and a 3-phase feedback current value $i_w$ calculated from the current values $i_u$ and $i_v$ are input to the vector rotator and 3 phase-to-2 phase converter 106. Further, an electrical angle (a magnetic pole position) $\theta_{re}$ calculated by the phase calculator 101 is input to the vector rotator and 3 phase-to-2 phase converter 106. The vector rotator and 3 phase-to-2 phase converter 106 calculates a d-axis current $i_d$ and a q-axis current $i_q$ from the 3-phase feedback current values $i_u$, $i_v$, and $i_w$ based on the electrical angle $\theta_{re}$. The vector rotator and 3 phase-to-2 phase converter 106 inputs the calculated d-axis current $i_d$ to the d-axis current controller 107. The vector rotator and 3 phase-to-2 phase converter 106 inputs the calculated q-axis current $i_q$ to the q-axis current controller 108.

The d-axis current controller 107 calculates a d-axis voltage command value $V^*_d$ based on a deviation between the d-axis current $i_d$ input from the vector rotator and 3 phase-to-2 phase converter 106 and a d-axis current command $i^*_d$.

The d-axis current controller 107 inputs the calculated d-axis voltage command value $V^*_d$ to the vector rotator and 2 phase-to-3 phase converter 109.

The q-axis current controller 108 calculates a q-axis voltage command value $V^*_q$ based on a deviation between the q-axis current $i_q$ input from the vector rotator and 3 phase-to-2 phase converter 106 and the q-axis current command value $i^*_q$ input from the speed controller 105. The q-axis current controller 108 inputs the calculated q-axis voltage command value $V^*_q$ to the vector rotator and 2 phase-to-3 phase converter 109.

The d-axis voltage command value $V^*_d$ from the d-axis current controller 107, the q-axis voltage command value $V^*_q$ from the q-axis current controller 108, and the electrical angle $\theta_{re}$ from the phase calculator 101 are input to the vector rotator and 2 phase-to-3 phase converter 109. The vector rotator and 2 phase-to-3 phase converter 109 calculates 3-phase voltage command values $V^*_u$, $V^*_v$, and $V^*_w$, based on the electrical angle $\theta_{re}$, from the d-axis voltage command value $V^*_d$ and the q-axis voltage command value $V^*_q$. The vector rotator and 2 phase-to-3 phase converter 109 inputs the calculated 3-phase voltage command values $V^*_u$, $V^*_v$, and $V^*_w$ to the power converter 110.

The power converter 110 converts a power supply voltage supplied from an external power supply based on the 3-phase voltage command values $V^*_u$, $V^*_v$, and $V^*_w$ input from the vector rotator and 2 phase-to-3 phase converter 109, and applies the power supply voltage to the respective coils of U, V, and W phases. Accordingly, a current flowing through the linear motor 21 is controlled so as to perform control of the linear motor 21.

The current transformer 111 measures currents flowing through the coils of U and V phases of the linear motor 21, and outputs a result of the measurement to the vector rotator and 3 phase-to-2 phase converter 106.

The initial magnetic pole position setter 112 sets a q^ axis current to 0 and a d^ axis current to $i_d$ to generate a thrust and operate the linear motor 21. The initial magnetic pole position setter 112 detects a magnetic pole position and sets the initial magnetic pole position based on an operation of the linear motor 21 obtained through the encoder 22. When the initial magnetic pole position is being set, the position controller 104 and the speed controller 105 do not operate.

A process of setting the initial magnetic pole position in the control device 10 in this embodiment will be described with reference to FIGS. 3 to 7. FIGS. 3 to 6 are flowcharts of the process of setting the initial magnetic pole position in the control device 10 in this embodiment. In the control device 10, when a supply of power starts or an instruction from the upper level control device is received and setting of the initial magnetic pole position starts, the initial magnetic pole position setter 112 sets a d^ axis magnetic pole position (an electric angle $\theta_{re}$ or an estimated magnetic pole position) to 180° (step S101), and executes a motor operation subroutine (step S102). The initial magnetic pole position setter 112 sets a current value which is (1/n) times a rated current as an initial value of an energization current value which is an initial value of a flowing current in the motor operation subroutine when setting the d^ axis magnetic pole position. n is, for example, 8 and the initial value of the energizing current value is set to a current value of ⅛ of the rated current. Further, n may be determined in advance based on, for example, a time until the mover begins to be moved by the thrust generated in the linear motor 21.

Figure 7:
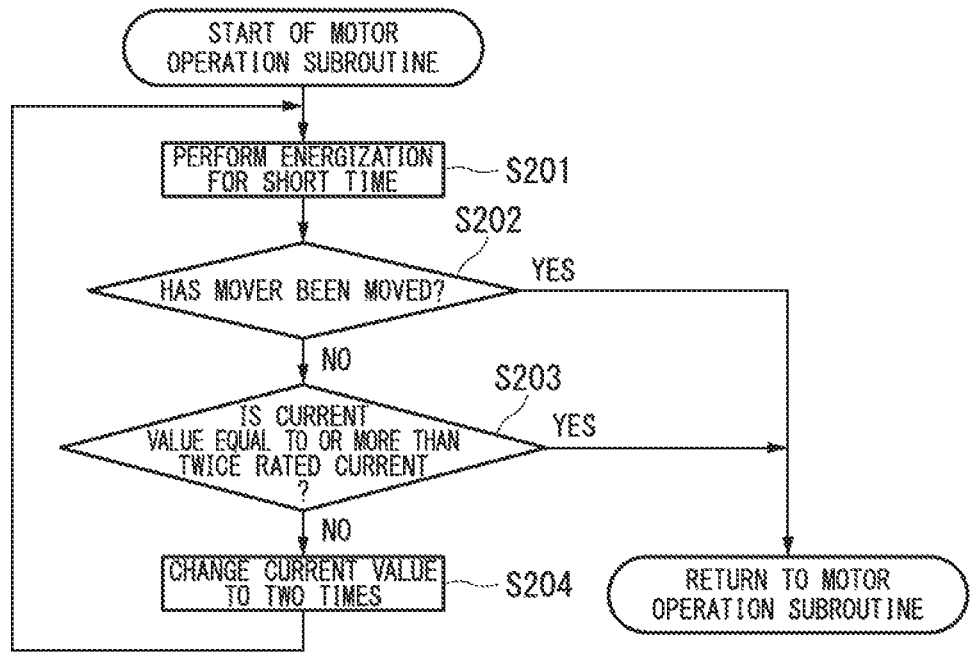
FIG. 7 is a flowchart of a motor operation subroutine performed by the control device 10 in the embodiment.

Processes in a motor operation subroutine will be described herein. FIG. 7 is a flowchart of a motor operation subroutine performed by the control device 10 in this embodiment. When the motor operation subroutine starts, the initial magnetic pole position setter 112 controls the vector rotator and 2 phase-to-3 phase converter 109 to apply voltages of U, V and W phases corresponding to the d^ axis magnetic pole position to the respective coils of U, V, and W phases of the linear motor 21 during a predetermined short time and perform pulse energization on the linear motor 21 (step S201). For the short time, a minimum time from an attempt to flow a current through each coil to an actual flow of a current through the coil and generation of the thrust is set. The short time is set to, for example, 10 milliseconds.

The initial magnetic pole position setter 112 determines whether or not the mover has been moved through the energization in step S201 based on the amount of movement of the mover detected by the encoder 22 (step S202). If the mover has been moved (step S202: YES), the motor operation subroutine ends, and the process returns to the next step of the step in which the motor operation subroutine is called (executed).

Further, when the mover has not been moved through the energization in step S201 (step S202: NO), the initial magnetic pole position setter 112 determines whether or not a current energizing current value is equal to or more than twice the rated current (step S203). When the energizing current value is equal to or more than twice the rated current (step S203: YES), the process ends the motor operation subroutine and returns to the next step of a step in which the motor operation subroutine is called (executed).

Further, if the current energizing current value is not equal to or more than twice the rated current (step S203: NO), the initial magnetic pole position setter 112 changes the energizing current value to twice the current energizing current value (step S204), returns the process to step S201, and repeatedly performs the process of steps S201 to S204.

In the motor operation subroutine, the respective voltages of U, V, and W phases corresponding to the set d^ axis magnetic pole position are applied to the coils of U, V, and W phases, and energizations using 1/n times, 2/n times, . . . , 2 times the rated current are performed in this order until the mover is moved.

Figure 3:
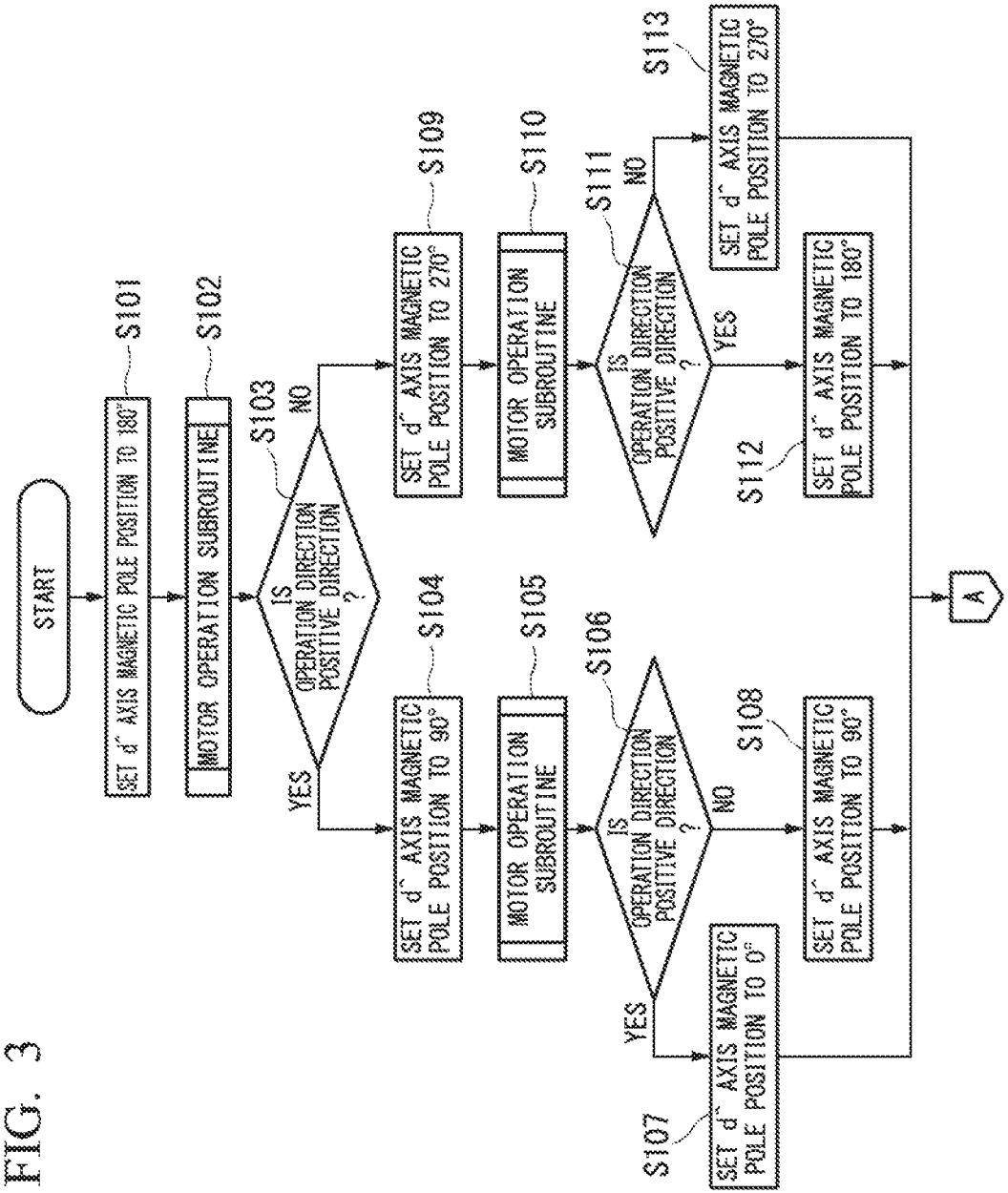
FIG. 3 is a first flowchart of a process of setting an initial magnetic pole position which is performed by the control device 10 in the embodiment.

In FIG. 3, description of the process of setting the initial magnetic pole position is continued.

The initial magnetic pole position setter 112 determines whether a direction in which the linear motor 21 has been operated through the motor operation subroutine (step S102), that is, a direction in which the mover has been moved, is a predetermined direction (a positive direction) (step S103). The predetermined direction is, for example, a direction in which the magnetic pole position (the electric angle) increases.

If the direction in which the linear motor 21 has been operated in step S102 is the positive direction (step S103: YES), the initial magnetic pole position setter 112 sets the d^ axis magnetic pole position to 90° and sets the energizing current value to 1/n times the rated current (step S104). The initial magnetic pole position setter 112 executes a motor operation subroutine (step S105). The motor operation subroutine executed in step S105 and a motor operation subroutine in the following description are the same as the motor operation subroutine described with reference to FIG. 7 described above.

The initial magnetic pole position setter 112 determines whether or not the direction in which the linear motor 21 has been operated through the motor operation subroutine (step S105) is the positive direction (step S106).

Figure 4:
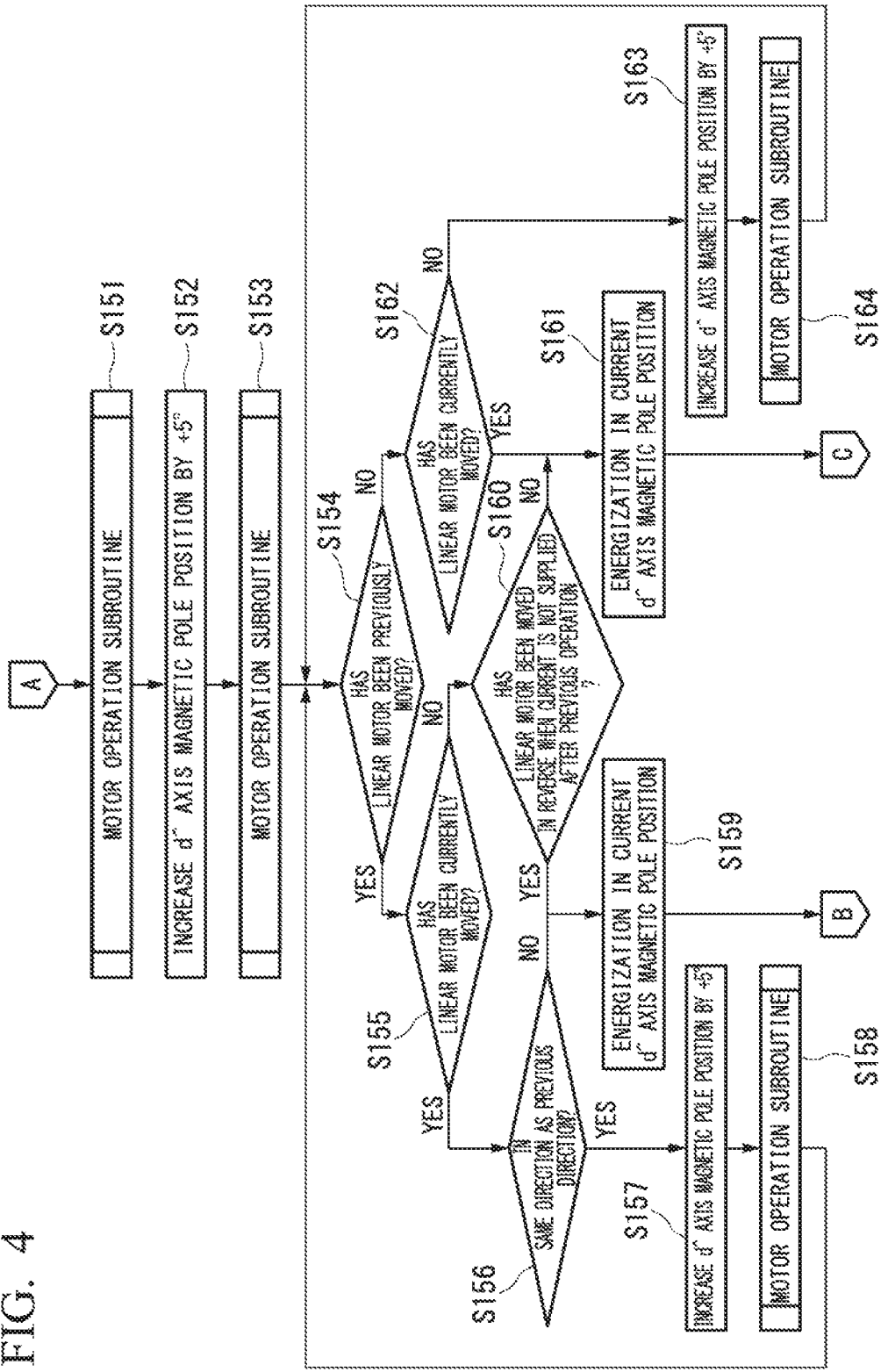
FIG. 4 is a second flowchart of the process of setting an initial magnetic pole position which is performed by the control device 10 in the embodiment.

If the direction in which the linear motor 21 has been operated is the positive direction in the determination of step S106 (step S106: YES), the initial magnetic pole position setter 112 sets the d^ axis magnetic pole position to 0° and sets the energizing current value to 1/n times the rated current (step S107), and the process proceeds to step S151 (FIG. 4).

On the other hand, if the direction in which the linear motor 21 has been operated is not the positive direction in the determination of step S106 (step S106: NO), the initial magnetic pole position setter 112 sets the d^ axis magnetic pole position to 90° and sets the energizing current value to 1/n times the rated current (step S108), and the process proceeds to step S151 (FIG. 4).

If the direction in which the linear motor 21 has been operated in step S102 is not the positive direction (step S103: NO), the initial magnetic pole position setter 112 sets the d^ axis magnetic pole position to 270° and sets the energizing current value to 1/n times the rated current (step S109). The initial magnetic pole position setter 112 executes the motor operation subroutine (step S110).

The initial magnetic pole position setter 112 determines whether or not the direction in which the linear motor 21 has been operated through the motor operation subroutine (step S110) is the positive direction (step S111).

If the direction in which the linear motor 21 has been operated is the positive direction in the determination of step S110 (step S111: YES), the initial magnetic pole position setter 112 sets the d^ axis magnetic pole position to 180° and sets the energizing current value to 1/n times the rated current (step S112), and the process proceeds to step S151 (FIG. 4).

On the other hand, if the direction in which the linear motor 21 has been operated is not the positive direction in the determination of step S110 (step S111: NO), the initial magnetic pole position setter 112 sets the d^ axis magnetic pole position to 270° and sets the energizing current value to 1/n times the rated current (step S113), and the process proceeds to step S151 (FIG. 4).

The initial magnetic pole position setter 112 executes the motor operation subroutine (step S151), increases the d^ axis magnetic pole position by +5° (a first amount of change), sets the energizing current value to 1/n times the rated current (step S152), and executes the motor operation subroutine (step S153).

The initial magnetic pole position setter 112 determines whether or not the linear motor 21 has been moved in a previous motor operation subroutine (step S154).

If the linear motor 21 has been moved in the previous motor operation subroutine (step S154: YES), the initial magnetic pole position setter 112 determines whether or not the linear motor 21 has been moved in the current motor operation subroutine (step S155).

If the linear motor 21 has been moved in the current motor operation subroutine (step S155: YES), the initial magnetic pole position setter 112 determines whether a direction in which the linear motor 21 has been moved in the previous motor operation subroutine is the same as a direction in which the linear motor 21 has been moved in the current motor operation subroutine (step S156).

If the linear motor 21 has been moved in the same direction in the previous and current motor operation subroutines (step S156: YES), the initial magnetic pole position setter 112 increases the d^ axis magnetic pole position by +5°, sets the energizing current value to 1/n times the rated current (step S157), executes the motor operation subroutine (step S158), and returns the process to step S154.

Figure 5:
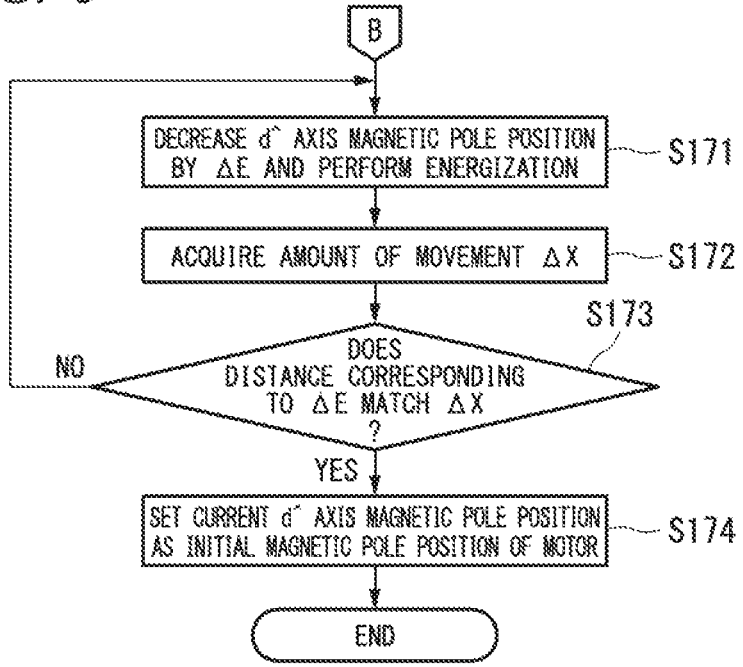
FIG. 5 is a third flowchart of the process of setting an initial magnetic pole position which is performed by the control device 10 in the embodiment.

On the other hand, if the linear motor 21 has not been moved in the same direction in the previous and current motor operation subroutines (step S156: NO), the initial magnetic pole position setter 112 performs direct current excitation in a current d^ axis magnetic pole position (step S159), and the process proceeds to step S171 (FIG. 5).

If the linear motor 21 has not been moved in the current motor operation subroutine in the determination of step S155 (step S155: NO), the initial magnetic pole position setter 112 determines whether or not the linear motor 21 has been moved in a reverse direction after the energization stops in the previous motor operation subroutine (step S160).

If the linear motor 21 has been moved in the reverse direction after the energization stops (step S160: YES), the initial magnetic pole position setter 112 performs the direct current excitation in the current d^ axis magnetic pole position (step S159), and the process proceeds to step S171 (FIG. 5).

Figure 6:
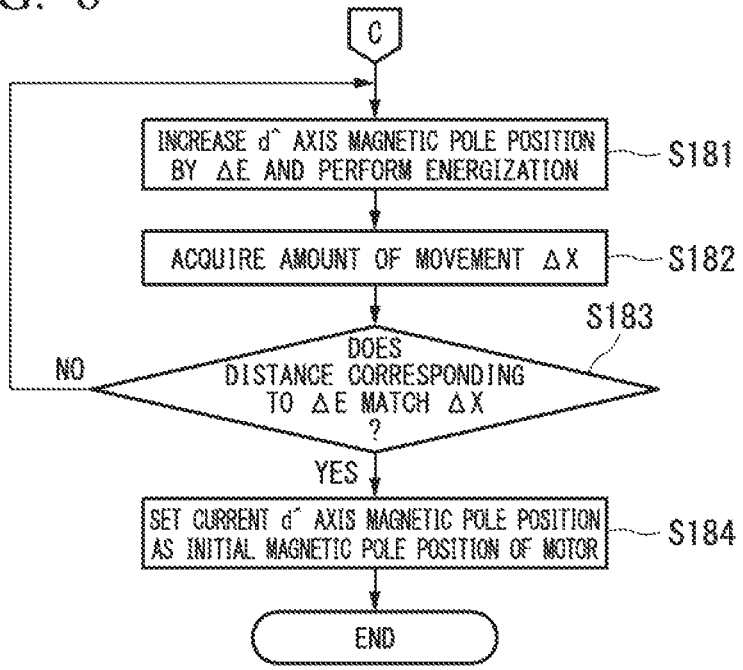
FIG. 6 is a fourth flowchart of the process of setting an initial magnetic pole position which is performed by the control device 10 in the embodiment.

On the other hand, if the linear motor 21 has not been moved in the reverse direction after the energization stops (step S160: NO), the initial magnetic pole position setter 112 performs the direct current excitation in the current d^ axis magnetic pole position (step S161), and the process proceeds to step S181 (FIG. 6).

If the linear motor 21 has not been moved in the previous motor operation subroutine in the determination of step S154 (step S154: NO), the initial magnetic pole position setter 112 determines whether the linear motor 21 has been moved in the current motor operation subroutine (step S162).

If the linear motor 21 has not been moved in the current motor operation subroutine (step S162: NO), the initial magnetic pole position setter 112 increases the d^ axis magnetic pole position by +5°, sets the energizing current value to 1/n times the rated current (step S163), executes the motor operation subroutine (step S164), and returns the process to step S154.

On the other hand, if the linear motor 21 has been moved in the current motor operation subroutine (step S162: YES), the initial magnetic pole position setter 112 performs direct current excitation in a current d^ axis magnetic pole position (step S161), and the process proceeds to step S181 (FIG. 6).

After the direct current excitation in step S159 (FIG. 4), the initial magnetic pole position setter 112 decreases the d^ axis magnetic pole position by ΔE (a second amount of change), and performs the direct current excitation at the d^ axis magnetic pole position (FIG. 5, step S171). The amount of change ΔE of the magnetic pole position is a predetermined amount of change, and is determined according to a detection resolution of the encoder 22, a control resolution of the control device 10, or the like. The initial magnetic pole position setter 112 acquires an amount by which the linear motor 21 has been moved by the direct current excitation of step S171, that is, an amount of movement of the mover (step S172).

The initial magnetic pole position setter 112 determines whether or not the amount of movement acquired in step S172 matches a distance corresponding to the amount of change ΔE (step S173). The distance corresponding to the amount of change ΔE is a distance by which the mover of the linear motor 21 has been moved if the d^ axis magnetic pole position has been changed by (E+ΔE) from E.

If the amount of movement matches the distance corresponding to the amount of change ΔE (step S173: YES), the initial magnetic pole position setter 112 determines that the mover of the linear motor 21 is located in the current d^ axis magnetic pole position, sets the current d^ axis magnetic pole position as an initial magnetic pole position of the linear motor 21 (step S174), and ends the process of setting the initial magnetic pole position.

On the other hand, if the amount of movement does not match the distance corresponding to the amount of change ΔE (step S173: NO), the initial magnetic pole position setter 112 returns the process to step S171, and repeatedly performs the process from step S171 to step S173.

After the direct current excitation in step S161 (FIG. 4), the initial magnetic pole position setter 112 increases the d^ axis magnetic pole position by ΔE, and performs the direct current excitation at the d^ axis magnetic pole position (FIG. 6, step S181), and the initial magnetic pole position setter 112 acquires an amount by which the linear motor 21 has been moved through the direct current excitation of step S181, that is, an amount of movement of the mover (step S182).

The initial magnetic pole position setter 112 determines whether the amount of movement acquired in step S182 matches the distance corresponding to the amount of change ΔE (step S183). If the amount of movement matches the distance corresponding to the amount of change ΔE (step S183: YES), the initial magnetic pole position setter 112 determines that the mover of the linear motor 21 is located in the current d^ axis magnetic pole position, sets the current d^ axis magnetic pole position as the initial magnetic pole position of the linear motor 21 (step S184), and ends the process of setting the initial magnetic pole position.

On the other hand, If the amount of movement does not match the distance corresponding to the amount of change ΔE (step S183: NO), the initial magnetic pole position setter 112 returns the process to step S181 and repeatedly performs the process from steps S181 to S183.

As described above, the control device 10 estimates which of four sections including 0° to 90°, 90° to 180°, 180° to 270°, and 270° to 360° (0°) includes the actual d-axis magnetic pole position of the linear motor 21 by performing the process of steps S101 to S113. The control device 10 sets a minimum value in the estimated section as the d^ axis magnetic pole position, performs pulse energization while shifting the d^ axis magnetic pole position by a predetermined amount (for example, 5°), and performs magnetic pole position refinement to approximate the d^ axis magnetic pole position to the actual d-axis magnetic pole position based on the movement of the linear motor 21 in two consecutive pulse energizations.

In this case, the control device 10 determines whether or not there is an external force acting on the mover based on the movement of the linear motor 21 or determines a direction of the external force relative to the movement direction of the mover when there is an external force.

The control device 10 determines whether to perform the direct current excitation while increasing the predetermined amount of change ΔE for the d^ axis magnetic pole position or whether to perform the direct current excitation while decreasing the predetermined amount of change ΔE according to whether there is an external force or the direction of the external force. The control device 10 performs the direct current excitation while changing the d^ axis magnetic pole position by the amount of change ΔE, determines whether the amount of movement of the mover of the linear motor 21 matches the amount of movement corresponding to the amount of change ΔE each time the control device 10 performs the direct current excitation, and determines that the actual d-axis magnetic pole position of the linear motor 21 matches the d^ axis magnetic pole position if the amounts match. That is, the control device 10 detects the actual d-axis magnetic pole position.

Figure 8A:
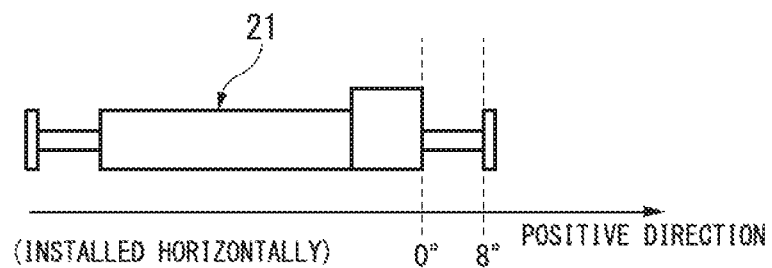
FIG. 8A is a diagram illustrating an installation example 1 of the linear motor 21 which is a setting target of an initial magnetic pole position.
Figure 8B:
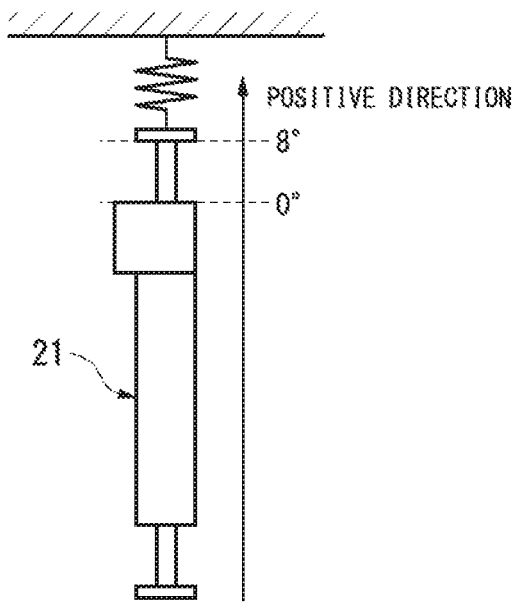
FIG. 8B is a diagram illustrating the installation example 1 of the linear motor 21 which is the setting target of the initial magnetic pole position.
Figure 8C:
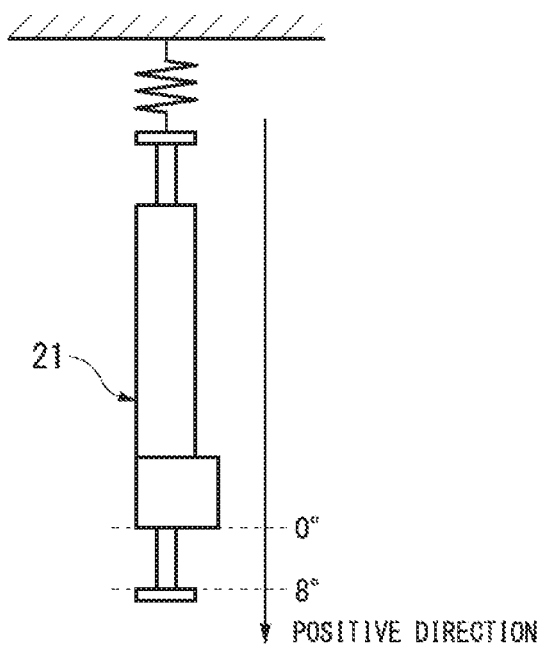
FIG. 8C is a diagram illustrating the installation example 1 of the linear motor 21 which is the setting target of the initial magnetic pole position.

Accordingly, the control device 10 can accurately detect the d-axis magnetic pole position of the linear motor 21 and improve the accuracy of control of the linear motor 21. Further, since the control device 10 performs the direct current excitation after estimating the section in which the actual d-axis magnetic pole position of the linear motor 21 exists, it is possible to suppress a distance by which the mover of the linear motor 21 is moved when the direct current excitation is performed. Further, since the d^ axis magnetic pole position is changed little by little (ΔE) when the direct current excitation is performed, it is possible to further suppress the distance by which the mover is moved. Further, it is possible to perform the detection of the d-axis magnetic pole position without depending on the actual d-axis magnetic pole position when the direct current excitation starts by comparing the amount of movement detected by the encoder 22 with the amount of movement corresponding to ΔE while changing the d^ axis magnetic pole position by ΔE An example in which the initial magnetic pole position is set by the control device 10 in the embodiment will be described with reference to FIGS. 8A, 8B, and 8C and FIGS. 9A and 9B. FIGS. 8A, 8B and 8C are diagrams illustrating installation examples of the linear motor 21 which is a setting target of the initial magnetic pole position. FIG. 8A illustrates a state in which a rod type linear motor 21 is horizontally installed and no external force acts on a mover (a rod). FIG. 8B illustrates a state in which the rod type linear motor 21 is vertically installed, and a biasing member such as a spring is attached to an end portion on an upper side in a vertical direction of the mover and is commensurate with a weight of the rod. FIG. 8C illustrates a case in which the rod type linear motor 21 is vertically installed, similar to FIG. 8B, but the linear motor 21 is in a different direction. In FIG. 8B, an upward side in the vertical direction is a positive direction of the d-axis magnetic pole position, whereas in FIG. 8C, a downward side in the vertical direction is the positive direction of the d-axis magnetic pole position. Further, all of FIGS. 8A to 8C illustrate a case in which the actual d-axis magnetic pole position of the linear motor 21 is 8°.

If the control device 10 starts setting of the initial magnetic pole position for the linear motor 21 which is in a state illustrated in FIGS. 8A, 8B and 8C, the pulse energization at the d^ axis magnetic pole position 180° is performed (steps S101 and S102). The linear motor 21 is moved in the positive direction due to this pulse energization (step S103: YES), and the pulse energization at the d^ axis magnetic pole position 90° is performed (steps S104 and S105). The linear motor 21 is also moved in the positive direction due to the current pulse energization (step S106: YES), the d^ axis magnetic pole position is set to 0°, and the pulse energization is performed again (steps S107 and S151).

Then, a pulse energization at 5° obtained by increasing the d^ axis magnetic pole position by +50 is performed (steps S152 and S153). In the previous pulse energization (the pulse energization at the d^ axis magnetic pole position 0°), the linear motor 21 is moved (step S154: YES), and in the current pulse energization (the pulse energization at the d^ axis magnetic pole position 5°), the linear motor 21 is also moved (step S155: YES). In both cases, since the linear motor 21 is moved in the same direction (step S156: YES), a pulse energization at 100 obtained by increasing the d^ axis magnetic pole position by +5° is further performed (steps S157 and S158), and the process returns to step S154.

In the previous pulse energization (the pulse energization at the d^ axis magnetic pole position 5°), the linear motor 21 is moved (step S154: YES), and in the current pulse energization (a pulse energization at a d^ axis magnetic pole position 10°), the linear motor 21 is also moved (step S155: YES), but the linear motor 21 is moved in a different direction (step S156: NO). Accordingly, a direct current excitation at the current d^ axis magnetic pole position 10° is performed (step S159).

Subsequently, a direct current excitation at a d^ axis magnetic pole position 9° obtained by decreasing the current d^ axis magnetic pole position by ΔE (for example, 1°) is performed (step S171), and an amount of movement ΔX of the mover of the linear motor 21 is acquired from the output of the encoder 22 (step S172). Since the mover has been pulled to the d^ axis magnetic pole position 10° due to the direct current excitation at the d^ axis magnetic pole position 10°, the mover is moved by a d^ axis magnetic pole position 1° due to the direct current excitation at the d^ axis magnetic pole position 9°. That is, the amount of movement corresponding to ΔE matches the amount of the movement ΔX (step S173: YES), and the control device 10 sets the current d^ axis magnetic pole position 9° as the actual d-axis magnetic pole position of the linear motor 21 (step S174), and starts the control of the linear motor 21.

Figure 9A:
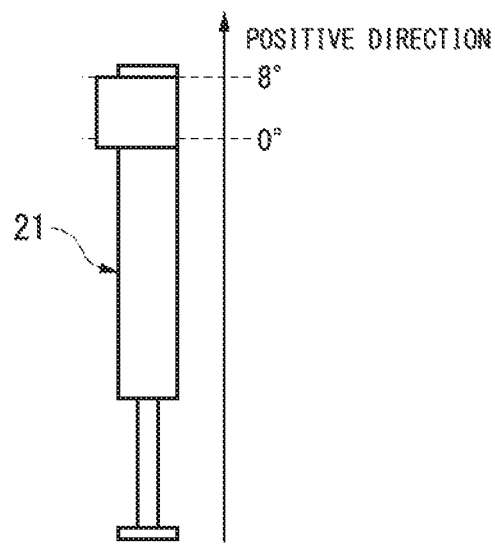
FIG. 9A is a diagram illustrating an installation example 2 of the linear motor 21 which is a setting target of the initial magnetic pole position.
Figure 9B:
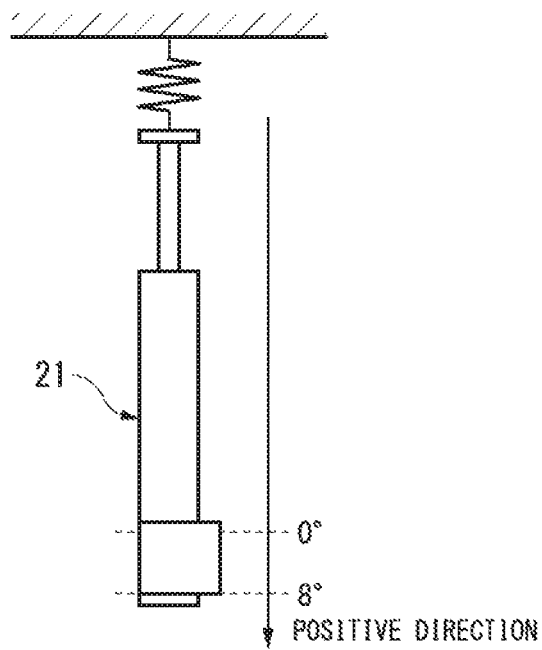
FIG. 9B is a diagram illustrating the installation example 2 of the linear motor 21 which is the setting target of the initial magnetic pole position.

FIGS. 9A and 9B are diagrams illustrating an installation example of the linear motor 21 which is a setting target of the initial magnetic pole position.

FIG. 9A illustrates a state in which a rod type linear motor 21 is vertically installed and a mover is stopped at a lower limit of a movement range due to its own weight. FIG. 9B illustrates a state in which the rod type linear motor 21 is vertically installed, a biasing member such as a spring is attached to an end portion on an upper side in a vertical direction of the mover, and the mover is vertically pulled upward and stopped at an upper limit of the movement range. In FIG. 9A, an upward side in the vertical direction is a positive direction of the d-axis magnetic pole position, and in FIG. 9B, a downward side in the vertical direction is the positive direction of the d-axis magnetic pole position. In both of FIGS. 9A and 9B, it is shown that the actual d-axis magnetic pole position of the linear motor 21 is 8°.

If the control device 10 starts setting of the initial magnetic pole position for the linear motor 21 which is in a state illustrated in FIGS. 9A and 8B, the pulse energization at the d^ axis magnetic pole position 180° is performed (steps S101 and S102). The linear motor 21 is moved in the positive direction due to this pulse energization (step S103: YES), and the pulse energization at the d^ axis magnetic pole position 90° is performed (steps S104 and S105). The linear motor 21 is also moved in the positive direction due to the current pulse energization (step S106: YES), the d^ axis magnetic pole position is set to 0°, and the pulse energization is performed again (steps S107 and S151).

Then, a pulse energization at 5° obtained by increasing the d^ axis magnetic pole position by +5° is performed (steps S152 and S153), but the mover has already reached the end of the movement range, as illustrated in FIGS. 9A and 9B, and cannot move toward a d^ axis magnetic pole position 5°. Since the linear motor 21 is not moved in the previous pulse energization (the pulse energization at the d^ axis magnetic pole position 0°) (step S154: NO) and the linear motor 21 is also not moved in the current pulse energization (the pulse energization at the d^ axis magnetic pole position 5°) (step S162: NO), a pulse energization at 10° obtained by further increasing the d^ axis magnetic pole position by +5° is performed (steps S163 and S164), and the process returns to step S154.

Since the linear motor 21 is not moved in the previous pulse energization (the pulse energization at the d^ axis magnetic pole position 5°) (step S154: NO) and the linear motor 21 is moved in the current pulse energization (the pulse energization at the d^ axis magnetic pole position 10°) (step S162: YES), the direct current excitation in the current d^ axis magnetic pole position 10° is performed (step S161).

Subsequently, a direct current excitation at a d^ axis magnetic pole position 11° obtained by increasing the current d^ axis magnetic pole position by ΔE (for example, 1°) is performed (step S181), and an amount of movement ΔX of the mover of the linear motor 21 is acquired from the output of the encoder 22 (step S182). Since the mover has been pulled to the d^ axis magnetic pole position 10° due to the direct current excitation at the d^ axis magnetic pole position 10°, the mover is moved by the d^ axis magnetic pole position 1° due to the direct current excitation at the d^ axis magnetic pole position 11°. That is, the amount of movement corresponding to ΔE matches the amount of movement ΔX (step S183: YES), and the control device 10 sets the current d^ axis magnetic pole position 11° as the actual d-axis magnetic pole position of the linear motor 21 (step S184), and starts the control of the linear motor 21.

Thus, even when the mover is at an end of the movement range due to its own weight or an external force, the control device 10 can perform direct current excitation while changing the d^ axis magnetic pole position by a predetermined amount (ΔE) based on an estimated d^ axis magnetic pole position, determine that the actual d-axis magnetic pole position matches the d^ axis magnetic pole position when an amount of movement ΔX at this time corresponds to the predetermined amount (ΔE), and perform the setting of the initial magnetic pole position. Accordingly, even when the external force acts on the linear motor 21, the control device 10 can accurately detect the d-axis magnetic pole position of the linear motor 21 and improve the accuracy of control of the linear motor 21.

In the control device 10 of this embodiment, the configuration in which, after the section in which the actual d-axis magnetic pole position exists is estimated in steps S101 to S113 of the process of setting the initial magnetic pole position, the minimum value in the estimated section is set as the d^ axis magnetic pole position (steps S107, S108, S112, and S113), and a refinement of the magnetic pole position is performed has been described. However, the present invention is not limited thereto, and the maximum value in the estimated section may be set as the d^ axis magnetic pole position, and the refinement of the magnetic pole position may be performed. In this case, the increase of +5° (the increase in the first amount of change) in steps S152, S157, and S163 is replaced with a decrease of −5°, the decrease of ΔE (the decrease in the second amount of change) in step S171 is replaced with an increase of ΔE, and the increase of ΔE in step S181 is replaced with a decrease of ΔE.

Further, 5° in steps S152, S157, and S163 or 1° in steps S171 and S181 in the process of setting the initial magnetic pole position of this embodiment is an example, and may be a different angle (an amount of change). However, for the amount of change (the second amount of change) in steps S171 and S181, a value smaller than the amount of change (the first amount of change) in steps S152, S157, and S163 is determined.

Further, the case in which the d-axis magnetic pole positions from 0° to 360° are divided into four sections at 90° intervals when a section in which the d-axis magnetic pole position exists is estimated in the process of setting the initial magnetic pole position of this embodiment has been described. However, the present invention is not limited thereto, and the d-axis magnetic pole positions may be divided into three sections at 120° intervals or may be divided into six sections at 60° intervals.

The control device 10 in the above-described embodiment may include a computer system therein. In this case, the process of setting the initial magnetic pole position described above is stored in a program format in a computer-readable recording medium, and this program is read and executed by the computer such that the process is performed. Here, the computer-readable recording medium refers to a magnetic disk, a magneto-optical disc, a CD-ROM, a DVD-ROM, a semiconductor memory, or the like. Further, this computer program may be distributed to the computer by a communication line, and the computer receiving this distribution may execute the program.

INDUSTRIAL APPLICABILITY

The present invention can also be applied to uses in which it is essential to recognize a magnetic pole position of a mover when a motor is driven.

REFERENCE SIGNS LIST

10 Control device
21 Linear motor

The invention claimed is:
1. A control device for linear motor that controls a linear motor, the control device comprising:
a section estimation unit that estimates which of a plurality of sections obtained by dividing magnetic pole positions from 0° to 360° includes a current magnetic pole position of the linear motor based on a movement direction of a mover by a plurality of pulse energizations;
a magnetic pole position refinement unit that performs pulse energization while changing the estimated magnetic pole position by a first predetermined amount of change from any one of a minimum value and a maximum value of the section estimated by the section estimation unit to the other, and approximates the estimated magnetic pole position to the current magnetic pole position based on the movement of the mover when the pulse energization is performed; and
a magnetic pole position detection unit that performs direct current excitation while changing the estimated magnetic pole position by a second amount of change smaller than the first amount of change and performs an acquisition of an amount of movement of the mover when the estimated magnetic pole position is changed by the second amount of change, after direct current excitation is performed at the estimated magnetic pole position approximated by the magnetic pole position refinement unit, sets the estimated magnetic pole position as the current magnetic pole position when the acquired amount of movement matches an amount of movement corresponding to the second amount of change, and repeat the acquisition when the acquired amount of movement does not match an amount of movement corresponding to the second amount of change.
2. The control device for linear motor according to claim 1,
wherein the magnetic pole position refinement unit determines that the refinement for approximating the estimated magnetic pole position to the current magnetic pole position is complete when a direction of movement of the mover is different between two consecutive pulse energizations or when the mover is moved in one of the pulse energizations and is not moved in the other pulse energization.
3. The control device for linear motor according to claim 2,
wherein, when the direction of movement of the mover is different between the two consecutive pulse energizations and when the mover is not moved in a current pulse energization between the two consecutive pulse energizations, the mover is moved in a previous pulse energization, and the mover is moved in reverse after the previous pulse energization, and when the mover is moved in the current pulse energization between the two consecutive pulse energizations and the mover is not moved in the previous pulse energization and when the mover is not moved in the current pulse energization between the two consecutive pulse energizations, the mover is moved in the previous pulse energization, and the mover is not moved in reverse after the previous pulse energization, the magnetic pole position detection unit switches between performing the direct current excitation while increasing the estimated magnetic pole position by the second amount of change and performing direct current excitation while decreasing the estimated magnetic pole position by the second amount of change.

4. A control method performed by a control device that controls a linear motor, the control method comprising:

a section estimation step of estimating which of a plurality of sections obtained by dividing magnetic pole positions from 0° to 360° includes a current magnetic pole position of the linear motor based on a movement direction of a mover by a plurality of pulse energizations;

a magnetic pole position refinement step of performing pulse energization while changing the estimated magnetic pole position by a first predetermined amount of change from any one of a minimum value and a maximum value of the section estimated in the section estimation step to the other, and approximating the estimated magnetic pole position to the current magnetic pole position based on the movement of the mover when the pulse energization is performed; and a magnetic pole position detection step of performing direct current excitation while changing the estimated magnetic pole position by a second amount of change smaller than the first amount of change and performing an acquisition of an amount of movement of the mover when the estimated magnetic pole position is changed by the second amount of change, after performing direct current excitation at the estimated magnetic pole position approximated in the magnetic pole position refinement step, setting the estimated magnetic pole position as the current magnetic pole position when the acquired amount of movement matches an amount of movement corresponding to the second amount of change and performing the acquisition again when the acquired amount of movement does not match an amount of movement corresponding to the second amount of change.

\* \* \* \* \*